United States Patent
Kobayashi et al.

(10) Patent No.: US 7,122,490 B2
(45) Date of Patent: Oct. 17, 2006

(54) ALUMINUM NITRIDE MATERIALS AND MEMBERS FOR USE IN THE PRODUCTION OF SEMICONDUCTORS

(75) Inventors: Yoshimasa Kobayashi, Nagoya (JP); Toru Hayase, Nagoya (JP); Naomi Teratani, Nagoya (JP); Jun Yoshikawa, Nagoya (JP); Naohito Yamada, Kasugai (JP)

(73) Assignee: NGK Insulators, Ltd., Nagoya (JP)

( * ) Notice: Subject to any disclaimer, the term of this patent is extended or adjusted under 35 U.S.C. 154(b) by 162 days.

(21) Appl. No.: 10/785,774

(22) Filed: Feb. 24, 2004

(65) Prior Publication Data

US 2004/0171474 A1  Sep. 2, 2004

Related U.S. Application Data

(60) Provisional application No. 60/451,105, filed on Feb. 28, 2003.

(30) Foreign Application Priority Data

Feb. 10, 2004 (JP) ............... P2004-033892

(51) Int. Cl.
*C04B 35/581* (2006.01)
*C04B 35/482* (2006.01)

(52) U.S. Cl. .................... 501/98.4; 501/98.5; 501/98.6

(58) Field of Classification Search ............. 501/98.4, 501/98.5, 98.6; 361/234, 233
See application file for complete search history.

(56) References Cited

U.S. PATENT DOCUMENTS

| | | | |
|---|---|---|---|
| 5,705,450 A | 1/1998 | Chiao | |
| 6,225,249 B1 | 5/2001 | Fujita et al. | |
| 6,403,510 B1 * | 6/2002 | Kuibira et al. | 501/98.5 |
| 6,607,836 B1 | 8/2003 | Katsuda et al. | |
| 6,800,576 B1 * | 10/2004 | Katsuda et al. | 501/98.4 |
| 2002/0110709 A1 | 8/2002 | Katsuda et al. | |
| 2003/0203804 A1 | 10/2003 | Teratani et al. | |
| 2004/0096706 A1 * | 5/2004 | Teratani et al. | 428/697 |

FOREIGN PATENT DOCUMENTS

| | | |
|---|---|---|
| EP | 0 548 424 A1 | 6/1993 |
| EP | 1 078 902 A1 | 2/2001 |
| EP | 1 249 859 A2 | 10/2002 |
| EP | 1 314 707 A2 | 5/2003 |
| JP | 401183469 * | 7/1989 |
| JP | 09-315867 | 12/1997 |
| JP | 10-154746 A1 | 6/1998 |

OTHER PUBLICATIONS

U.S. Appl. No. 10/704,997, filed Nov. 10, 2003, Teratani et al.
VanDamme N. S. et al., "Liquid-Phase Sintering of Aluminum Nitride by Europium Oxide Additives" Journal of the American Ceramic Society, American Ceramic Society, Columbus, US, vol. 72, No. 8, Aug. 1, 1989, pp. 1409-1414.

* cited by examiner

*Primary Examiner*—Karl Group
(74) *Attorney, Agent, or Firm*—Burr & Brown

(57) ABSTRACT

A novel aluminum nitride material having a low room temperature volume resistivity is provided. The aluminum nitride material has an aluminum nitride main component and includes at least 0.03 mol % of europium oxide. The aluminum nitride material has an aluminum nitride phase and a europium-aluminum composite oxide phase. An aluminum nitride material also provided having an aluminum nitride main component, wherein a total content of europium oxide and samarium oxide is at least 0.09 mol %. The aluminum nitride material has an aluminum nitride phase and a composite oxide phase containing at least europium and aluminum.

35 Claims, 10 Drawing Sheets
(5 of 10 Drawing Sheet(s) Filed in Color)

ALUMINUM NITRIDE MATERIALS AND MEMBERS FOR USE IN THE PRODUCTION OF SEMICONDUCTORS

CROSS REFERENCE TO RELATED APPLICATIONS

This application claims the benefit of U.S. provisional application 60/451,105 filed on Feb. 28, 2003, and claims the benefit of Japanese Patent Application P2004-33892 filed on Feb. 10, 2004, the entireties of which are incorporated by reference.

BACKGROUND OF THE INVENTION

1. Field of the Invention

The invention relates to an aluminum nitride material and a member for use in the production of semiconductors.

2. Related Art Statement

An electrostatic chuck system utilizing Johnson-Rahbek effect is useful for the adsorption and retention of semiconductor wafers. In such system, the volume resistivity of the substrate of the chuck may preferably be $10^8$ to $10^{13}$ Ω·cm for improving adsorption force and speed of response. It is therefore desirable to control the volume resistivity of the substrate within $10^8$ to $10^{13}$ Ω·cm in a temperature range intended for use, in the development of an electrostatic chuck.

For example, the assignee filed Japanese patent publication 9-315, 867A and disclosed a method of adding a trace amount of yttrium oxide into aluminum nitride having a high purity to control the volume resistivity at room temperature at a value between $10^8$ to $10^{13}$ Ω·cm.

The assignee has further filed U.S. Patent publication 2002-0110709A1 and disclosed an aluminum nitride sintered body containing samarium in a content of 0.04 mole percent or more to generate continuous samarium-aluminum oxide phase. The thus obtained sintered body has a volume resistivity of $10^{12}$ Ω·cm or lower at room temperature.

SUMMARY OF THE INVENTION

The effects of the addition of rare earth elements other than yttrium to an aluminum nitride sintered body is not described in Japanese patent publication 9-315, 867A. According to the aluminum nitride sintered body described in U.S. Patent publication 2002-0110709A1, it is necessary to increase the content of samarium to 0.04 mole percent or higher calculated as the oxide for realizing a volume resistivity of about $10^{12}$ Ω·cm at room temperature. As the content of samarium is higher, the volume resistivity at room temperature decreases.

An object of the present invention is to provide a novel aluminum nitride based material having a low volume resistivity at room temperature.

A first aspect of the present invention provides an aluminum nitride material comprising aluminum nitride as a main component and europium in a content of 0.03 mole percent or more calculated as the oxide ($Eu_2O_3$). The material has aluminum nitride and europium-aluminum composite oxide phases.

A second aspect of the present invention provides an aluminum nitride material comprising aluminum nitride as a main component and europium and samarium in a total content of 0.09 mole percent or more calculated as the oxides. The material has an aluminum nitride phase and a composite oxide phase containing at least europium and aluminum.

The inventors have found that the volume resistivity of an aluminum nitride material can be reduced by adding a predetermined amount of europium in the material to generate a composite oxide phase containing europium and aluminum.

The inventors have further found that the volume resistivity of an aluminum nitride material can be reduced by adding predetermined amounts of europium and samarium in the material to generate a composite oxide phase containing at lease europium and aluminum. It is further proved that the dependency of the volume resistivity of the material on an applied voltage can be reduced.

In U.S. Patent publication 2002-0110709A1, europium is listed as an additive when samarium is added to the material in an amount of 0.04 mole percent or more (calculated as the oxide). It is not disclosed, however, to add europium in an amount of 0.03 mole percent calculated as the oxide to generate a composite oxide phase containing europium and aluminum.

The effects, features and advantages of the invention will be appreciated upon reading the following description of the invention when taken in conjunction with the attached drawings, with the understanding that some modifications, variations and changes of the same could be made by the skilled person in the art.

BRIEF DESCRIPTION OF THE DRAWINGS

The file of this patent contains at least one drawing executed in color. Copies of this patent with color drawing(s) will be provided by the Patent and Trademark Office upon request and payment of the necessary fee.

DETAILED DESCRIPTION OF THE INVENTION

Figure 1:
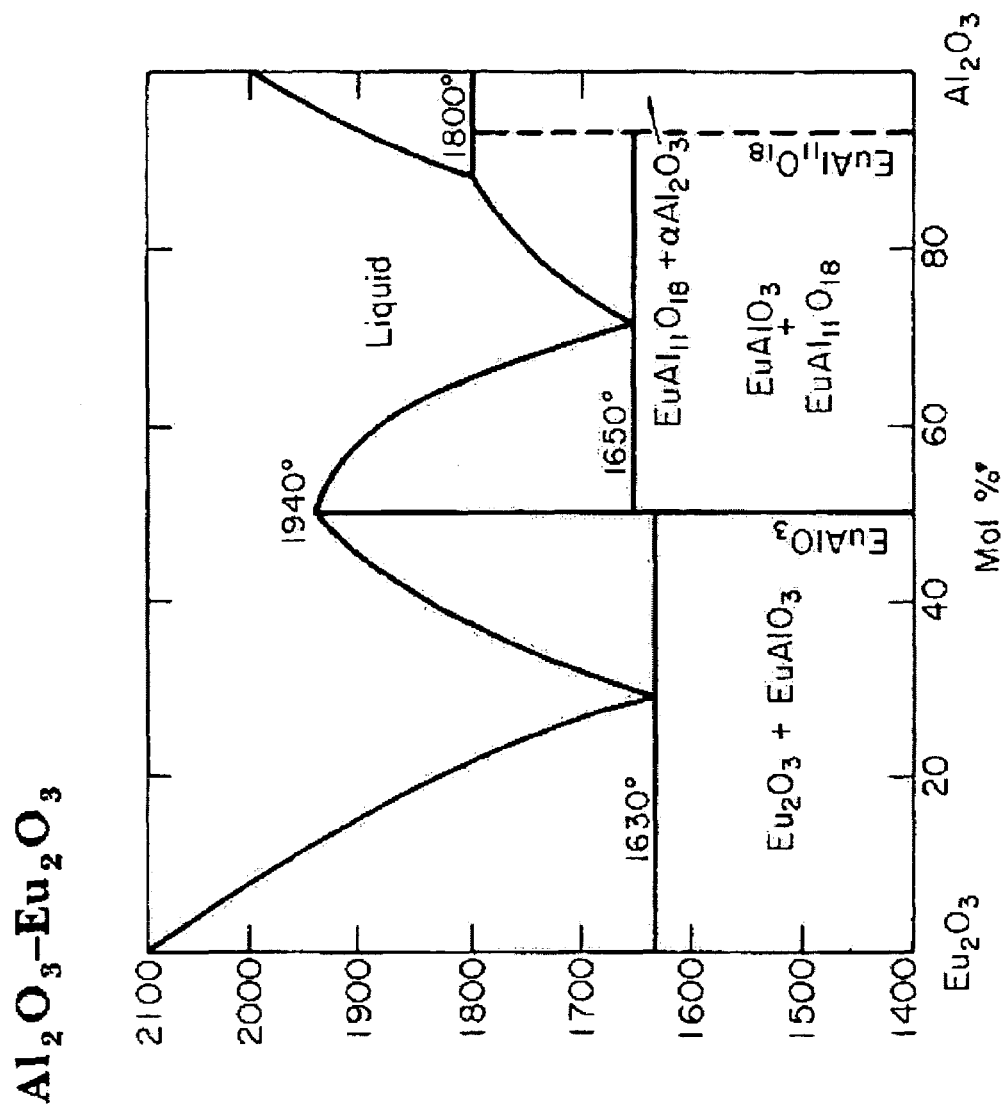
FIG. 1 is a phase diagram of an $Eu_2O_3$—$Al_2O_3$ system.

The aluminum nitride material according to the present invention is preferably an aluminum nitride sintered body. The content of aluminum in the aluminum nitride material should be sufficient to form aluminum nitride grains as the main phase. The aluminum content is preferably not lower than 35 weight percent, and more preferably, not lower than 50 weight percent, of the material.

According to the first aspect of the present invention, the content of europium calculated as the oxide is 0.03 mole percent or higher. The content is preferably 0.05 mole percent or higher, and more preferably, 0.1 mole percent or higher, for reducing the volume resistivity. Further, the content of europium calculated as the oxide is preferably 10 mole percent or lower, and more preferably, 5 mole percent or lower, for improving the thermal conductivity of the aluminum nitride material.

According to the first aspect of the present invention, the molar ratio of the content of europium calculated as the oxide, to that of alumina ($Eu_2O_3/Al_2O_3$) is preferably 0.2 or lower. The voltage-current property can be made more ohmic. More preferably, the ($Eu_2O_3/Al_2O_3$) ratio is 0.090 or lower. It is thus possible to reduce the α value to 1.6 or lower, and more preferably, to 1.4 or lower in a voltage range of 50 V/mm to 500 V/mm, provided that $I=kV^\alpha$; wherein "V" represents a voltage applied on the material, "I" represents a leakage current when a voltage of "V" is applied on the material, "k" represents a constant and a represents a non-linear index. From the viewpoint of reducing the a value, the ($Eu_2O_3/Al_2O_3$) ratio is more preferably 0.075 or lower.

Further the lower limit of the ($Eu_2O_3/Al_2O_3$) ratio is not particularly defined, and is normally 0.03 or higher. When the ($Eu_2O_3/Al_2O_3$) ratio is lower than 0.03, the volume resistivity tends to increase.

According to the second aspect of the present invention, the total content of europium and samarium is 0.09 mole percent or higher. The total of the contents calculated as the oxides is preferably 0.15 mole percent or higher, and more preferably, 0.2 mole percent or higher, for reducing the volume resistivity. Further, from the viewpoint of improving the thermal conductivity of the aluminum nitride material, the total content of europium and samarium calculated as the oxides is preferably 10 mole percent or lower, and more preferably, 5 mole percent or lower.

In the second aspect of the present invention, the molar ratio of the contents of europium to samarium calculated as the oxides in raw material, ($Eu_2O_3/Sm_2O_3$) is preferably 0.2 or higher. It is thus possible to reduce the α value to 1.4 or lower. For further reducing the α value, (for making the dependency of the volume resistivity on applied voltage more ohmic), the ($Eu_2O_3/Sm_2O_3$) ratio is preferably 0.6 or higher, more preferably, 1.0 or higher, and most preferably, 1.5 or higher.

The europium and samarium content, calculated as oxides ($Eu_2O_3$, $Sm_2O_3$), is calculated based on the chemical analysis values of europium and samarium contained in the aluminum nitride material. The total oxygen content in the material is determined by infrared absorptiometry. The oxygen content in $Eu_2O_3$, $Sm_2O_3$ and MgO is subtracted from the measured total oxygen content to calculate the remaining oxygen. The content of $Al_2O_3$ is calculated under the provision that all the remaining oxygen atoms constitute $Al_2O_3$.

The "α" value will be described further in detail. In an aluminum nitride sintered body described in Japanese patent publication 9-315, 867A, it is possible to reduce the volume resistivity. It has been shown, however, that such a sintered body exhibits a non-linear relationship between voltage and current. That is, the change of leak current largely depends on the change of an applied voltage. Specifically, a non-linear index "α" is proved to be as high as 1.5 to 2.0, provided that $I=kV^\alpha$, where "V" represents a voltage applied on the material, "I" represents a leakage current when a voltage of "V" is applied and "k" represents a constant.

Such non-ohmic voltage-current behavior is not desirable for members in semiconductor producing systems, such as a semiconductor susceptor surrounding an electrostatic chuck electrode embedded therein. For example, in the case of a ceramic electrostatic chuck, a dielectric layer is provided between the electrostatic chuck electrode and the surface. The thickness of the dielectric layer is not constant and has some degree of deviation or change. The voltage applied between the electrode and surface is constant at the same time. The applied electric field (V/mm) is smaller in a region where the dielectric layer is thicker, and the field (V/mm) is larger in a region where the dielectric layer is thinner. When the leakage current shows non-ohmic behavior according to the change of the applied voltage, the deviation of the leakage current on the surface becomes larger so that the adsorption force becomes unstable. The aluminum nitride material of the present invention may exhibit an extremely low α and ohmic resistance property depending on the conditions.

In a preferred embodiment, the aluminum nitride material has a room temperature volume resistivity of $10^{13}$ Ω·cm or lower, and even $10^{12}$ Ω·cm or lower, at an applied voltage of 500 V/mm.

In a preferred embodiment of the first and second aspects, the europium-aluminum composite oxide phase has a network-like microstructure. That is, the europium-aluminum composite oxide phase is formed along the interfaces (intergranular phase) between aluminum nitride grains so that the phase surrounds the grains to form a fine network like structure.

The mean grain diameter of aluminum nitride grains in the material is preferably 3 μm or larger, and more preferably, 5 μm or larger. The mean grain diameter is preferably 20 μm or smaller.

The aluminum nitride material according to the first aspect of the present invention contains an europium-aluminum composite oxide phase. Although the specific composition of the europium-aluminum composite oxide phase is not limited, the phase preferably includes at least one of $EuAl_{11}O_{18}$ and $EuAl_{12}O_{19}$ phases. These crystalline phases have peak tops in a range of 18.5 to 19.0° in an X-ray diffraction chart. The material may also contain the other crystalline phases such as $EuAl_2O_4$ and $Al_5O_6N$ phases.

The aluminum nitride material according to the second aspect of the present invention contains a composite oxide phase containing at least europium and aluminum. The composite oxide phase may be an europium-aluminum composite oxide phase or an europium-samarium-aluminum composite oxide phase. Although the specific composition of the europium-aluminum composite oxide phase is not limited, the phase may be an $EuAl_{11}O_{18}$ or an $EuAl_{12}O_{19}$ phase. Although the specific composition of the europium-samarium-aluminum composite oxide phase is not limited, the phase may be a $(Re)Al_{11}O_{18}$, $(Re)Al_{12}O_{19}$, or $Mg(Re)Al_{12}O_{19}$ phase (Re represents Eu and Sm). The material may further include a samarium-aluminum composite oxide phase in addition to the europium-aluminum composite oxide and europium-samarium-aluminum composite oxide phases. These crystalline phases have peak tops in a range of 18.5 to 19.0° in an X-ray diffraction chart. The aluminum nitride material may further includes the other crystalline phases such as $EuAl_2O_4$, $SmAlO_3$, $Al_5O_6N$, and $MgAl_2O$, phases.

The relative density of the aluminum nitride material is preferably 95% or higher.

The aluminum nitride material may contain a rare earth element other than samarium and europium. Such additional elements include scandium, yttrium, lanthanum, cerium, praseodymium, neodymium, promethium, gadolinium, terbium, dysprosium, holmium, erbium, thulium, ytterbium and lutetium.

The raw material of aluminum nitride may be produced by various processes, including direct nitriding, reduction nitriding and gaseous phase synthesis from an alkyl aluminum.

Materials of europium and samarium are added to aluminum nitride raw materials. Such materials include europium oxide and samarium oxide. Alternatively, a compound which forms samarium oxide or europium oxide upon heating (a precursor of samarium or europium oxide) may be added to the raw material of aluminum nitride. The precursor includes europium nitrate, samarium nitrate, europium sulfate, samarium sulfate, europium oxalate and samarium oxalate. The precursors may be added as powder. Alternatively, each precursor may be dissolved into a solvent to obtain solution, which is then added to the raw material. It is possible to uniformly disperse europium or samarium in the intergranular phase between aluminum nitride grains by dissolving the precursors in a solvent.

The raw material may be shaped by any known methods including dry press, doctor blade, extrusion, casting and tape forming methods.

In a formulating step, aluminum nitride raw material powder may be dispersed into a solvent and the compound of a rare earth element described above may be added in a form of oxide powder or solution. In a mixing step, it is possible to simply agitate the formulation. When the raw powder contains aggregates, it is possible to use a mixing and grinding machine, such as a pot mill, trommel and attrition mill, for grinding the aggregates. When using an additive which is soluble in a solvent for grinding, it is enough to carry out the mixing and grinding step for a short (minimum) time required for the grinding the grains. Further, a binder component, such as polyvinyl alcohol, may be added.

The solvent used for the mixing step may be volatilized, preferably by spray dry method. After carrying out vacuum drying process, the grain distribution of the dried grains may preferably be adjusted by passing the grains through a mesh.

In a step of shaping the powdery material, the material may be pressed using a mold to provide a disk-shaped body. The pressure for pressing raw material is not particularly limited, as long as the shaped body may be handled without causing any fracture. The pressure is preferably not lower than 100 kgf/cm$^2$. The powdery material may be supplied into a die for hot pressing without particularly shaping the powdery material.

The sintered body according to the invention is preferably produced by sintering at ambient pressure or hot pressing, preferably at a pressure of 50 kgf/cm$^2$ or larger.

The material according to the invention is preferably used for various members in a system for producing semiconductors, such as systems for treating silicon wafers and for manufacturing liquid crystal displays.

The member for producing semiconductors according to the invention is preferably an anti-corrosion member, such as a susceptor for a system for producing semiconductors. The inventive member is also suitable for an article having the above anti-corrosion member and a metal member embedded within the anti-corrosion member. Examples of such anti-corrosion members include a susceptor, a ring and a dome set in a semiconductor producing system. A resistance heating element, an electrode for an electrostatic chuck and an electrode for generating high-frequency waves may be embedded within the susceptor.

The aluminum nitride material according to the invention has a low electrical resistivity as described above, and therefore suitable as a substrate of an electrostatic chuck. An electrostatic chuck electrode is embedded within the substrate of the chuck. It is possible to further embed a resistance-heating element, an electrode for generating plasma or the like within the substrate.

In a preferred embodiment of the first and second aspects of the present invention, the aluminum nitride material contains an element belonging to Group IIA of the Periodic Table in an amount of 0.01 to 2 mole percent calculated as the oxide. It is thus possible to lower a sintering temperature and to reduce the grain diameters so as to further improve the strength of the sintered body. The element may preferably be Mg and/or Ca. Further, the content of the element belonging to Group IIA of the Periodic Table is preferably 0.1 mole percent or higher, or, 1.2 mole percent or lower.

In a preferred embodiment of the first and second aspects of the present invention, the material contains an element belonging to Group IVA of the Periodic Table in an amount of 0.01 to 10 mole percent calculated as the nitride. It is thus possible to control the volume resistivity at a higher precision. Such elements are preferably Ti, Zr or Hf, and most preferably, Ti. The content of the element belonging to Group IVA of the Periodic Table is more preferably 0.5 mole percent or more from the above viewpoint, or, 4 mole percent or lower.

In a preferred embodiment of the first and second aspects of the present invention, the material includes a columnar aggregate having an intergranular and crystalline phases. The intergranular phase includes at least one of (Re)Al$_{11}$O$_{18}$, (Re)Al$_{12}$O$_{19}$, and Mg(Re)Al$_{12}$O$_{19}$ phases (Re represents Eu and Sm). The crystalline phase includes at least one of aluminum nitride, aluminum oxide, aluminum oxynitride and aluminum-magnesium composite oxide. The intergranular phase forms a network microstructure in the aggregate. When a polished surface of the material is observed as a backscattering electron image in a magnitude of 100 to 1000, the aggregate has an aspect ratio of 2 or more and a length of 10 to 1000 μm. The volume resistivity of the material can be further reduced by increasing the length of the aggregate, and can be elevated by reducing the length of the aggregate.

EXAMPLES

Aluminum nitride sintered bodies were produced and the properties were evaluated as follows.

1 a) Production of Mixed Powder of Aluminum Nitride/Europium Oxide

Commercial AlN powder produced by reduction nitriding (an oxygen content of 0.87 weight percent) was used. Commercial powder of europium oxide with a purity of 99.9 percent or more and a mean grain diameter of 1.1 μm was used.

Each powder was weighed as shown in Table 1. Weighed powders were then subjected to wet blending using isopropyl alcohol as a solvent, a nylon pot and nylon media for 4 hours to obtain slurry. After the blending, the slurry was collected and dried at 110° C. The thus dried powder was then subjected to heat treatment in an atmosphere at 450° C. for 5 hours to remove carbon content contaminated during the wet blending to produce raw mixed powder. The compositions (molar percent) were calculated ignoring the contents of impurities in AlN, $Eu_2O_3$ and $Al_2O_3$ powders.

(1b) Production of Mixed Powder of Aluminum Nitride/Europium Oxide/Samarium Oxide/(Magnesium Oxide)/(Calcium Carbonate)/Titanium Nitride)

AlN powder produced by reduction nitriding (an oxygen content of 0.87 weight percent) was used. Commercial powder of europium oxide with a purity of 99.9 percent or more and a mean grain diameter of 1.1 µm was used. Commercial powder of samarium oxide with a purity of not lower than 99.9 percent and a mean grain diameter of 1.1 µm was used. Commercial powder of magnesium oxide with a purity of not lower than 99.4 percent and a mean grain diameter of 1.1 µm was used. Commercial powder of calcium carbonate with a purity of 99.9 percent or higher and a mean grain diameter of not larger than 12 µm, and commercial powder of titanium nitride with a purity of not lower than 95 percent or higher and mean grain diameter of 1.3 µm were used.

The powdery raw materials were weighed as shown in Table 1, and then formulated as described in the step (1 a) to obtain formulated powder. The compositions (molar percent) of the formulated powder were calculated ignoring the contents of impurities in AlN, $Eu_2O_3$, $Al_2O_3$, MgO, $CaCO_3$, and TiN powders.

(2) Shaping and Sintering Steps

Each formulated powder obtained in (1) was then shaped by means of uniaxial pressing at a pressure of 200 kgf/cm² to obtain a disk-shaped body with a diameter φ of 50 mm or 100 mm and a thickness of 20 mm, which was then contained within a mold made of graphite for sintering.

Each shaped body was sintered by hot pressing at a pressure of 200 kgf/cm², at the temperature and holding time period shown in Table 1, and then cooled. During the sintering, the shaped body was set in vacuum from room temperature to 1000° C. and then nitrogen gas was introduced at a pressure of 1.5 kgf/cm² from 1000° C. to each sintering temperature.

(3) Evaluation

The thus obtained sintered bodies were processed and then subjected to the following evaluations.

(Contents of Eu, Sm, Mg, Ca, Ti, O, and C)

The contents are measured by chemical analysis.

(Content of $Eu_2O_3$)

The above obtained "content of Eu" is converted to the content of $Eu_2O_3$. This value is represented as "converted content of $Re_2O_3$ in Table 1 (Examples 1 to 6).

(Content of $Sm_2O_3$)

The above obtained "content of Sm" is converted to the content of $Sm_2O_3$. This value is also represented as "content of $Re_2O_3$ in Table 1.

(Content of $Al_2O_3$)

The total content of oxygen in the sintered body is obtained. The oxygen contents in $Re_2O_3$, MgO and CaO are then subtracted from the total content of oxygen to calculate the remaining oxygen. The content of $Al_2O_3$ is calculated under the provision that all the remaining oxygen atoms constitute $Al_2O_3$.

(Bulk Density, Open Porosity)

They are measured by Archimedes method using pure water as a medium.

(Volume Resistivity)

Volume resistivity is measured by a method according to "JIS C 2141" under a vacuum from room temperature to about 400° C. The test sample has the following parts: a plate with 50 mm×50 mm×1 mm; a main electrode with a diameter of 20 mm; a guard electrode with an inner diameter of 30 mm and outer diameter of 40 mm; and an applying electrode with a diameter of 45 mm. The electrodes were formed of silver. The applied voltage was 500 V/mm. A current was read one minute after the application of voltage so that the volume resistivity is calculated.

In the Columns in Table 2, for example, "$1.1 \times 10^{12}$" is represented as "1.1E+12". The same method of representation is also applied in Tables 4, 6 and 8.

(Activation Energy)

An activation energy (Ea) of temperature dependency of volume resistivity from room temperature to 300° C. is calculated according to the following equation:

$$\ln \sigma = A - Ea/(kT);$$

wherein

σ: electrical conductivity=1/ρ

ρ: volume resistivity;

k: Boltzman's constant;

T: absolute temperature; and

A: a constant.

(The α Value)

The voltage applied on the sample is changed from 10 to 500 V/mm. Each current value is measured about 60 seconds after the application of voltage. The applied voltage and current values are plotted in a graph. In the graph, the leakage current "I" is assigned to the vertical axis on logarithm scale, and the applied voltage "V" is assigned to the horizontal axis on logarithm scale. The relationship of the current "I" and voltage "V" is fitted to a linear function in the graph representing a function of $I=kV^\alpha$ based on least square method to calculate the parameters "α" and "k." The "α" value is calculated as a gradient of the linear function and shown in the tables.

(Thermal Conductivity)

Thermal conductivity is measured by laser flash method.

(Mean Grain Diameter of AlN Grains)

The sintered body is polished to obtain a polished surface. The microstructure on the surface is observed using an electron microscope to measure the grain diameter values of AlN grains. An average of 30 values is calculated.

(Length of Columnar Aggregate)

The sintered body is polished to obtain a polished surface. The microstructure on the surface is observed using an electron microscope to measure the lengths of the columnar aggregates. An average of 30 values of the lengths is calculated.

(Crystalline Phase)

It is determined by using a rotating anode type X-ray diffraction system "RINT" supplied by "Rigaku Denki" under the following conditions: CuK α, 50 kV, 300 mA, and 2 θ=10 to 70°.

TABLE 1

| Examples 1–11 | powdery raw material composition ||||  sintering conditions || properties of sintered body |||||||
|---|---|---|---|---|---|---|---|---|---|---|---|---|---|
| | AlN powder oxygen content Wt % | $Eu_2O_3$ mol % | $Sm_2O_3$ mol % | $Al_2O_3$ mol % | maximum temperature °C. | holding time h | chemical analysis data |||| $Re_2O_3$ converted content mol % | $Al_2O_3$ converted content mol % | $Re_2O_3/Al_2O_3$ molar ratio |
| | | | | | | | Eu content wt % | Sm content Wt % | O content wt % | C content wt % | | | |
| 1 | 0.87 | 0.06 | — | — | 1900 | 4 | 0.39 | — | 0.71 | 0.027 | 0.053 | 0.554 | 0.095 |
| 2 | 0.87 | 0.12 | — | — | 1900 | 4 | 0.74 | — | 0.74 | 0.030 | 0.101 | 0.536 | 0.188 |
| 3 | 0.87 | 0.03 | — | 0.38 | 1900 | 4 | 0.22 | — | 1.16 | 0.027 | 0.031 | 0.990 | 0.031 |
| 4 | 0.87 | 0.12 | — | 1.27 | 1900 | 4 | 0.71 | — | 2.16 | 0.029 | 0.098 | 1.796 | 0.055 |
| 5 | 0.87 | 0.06 | — | 0.64 | 1900 | 4 | 0.37 | — | 1.46 | 0.029 | 0.051 | 1.218 | 0.042 |
| 6 | 0.87 | 0.34 | — | 3.70 | 1900 | 4 | 1.69 | — | 4.01 | 0.029 | 0.241 | 3.384 | 0.071 |
| 7 | 0.87 | 0.06 | 0.06 | 1.27 | 1900 | 4 | 0.35 | 0.33 | 2.17 | 0.027 | 0.094 | 1.802 | 0.052 |
| 8 | 0.87 | 0.08 | 0.03 | 1.27 | 1900 | 4 | 0.51 | 0.22 | 2.18 | 0.028 | 0.101 | 1.800 | 0.056 |
| 9 | 0.87 | 0.04 | 0.35 | 0.67 | 1900 | 4 | 0.14 | 1.91 | 1.26 | 0.050 | 0.284 | 0.811 | 0.350 |
| 10 | 0.87 | 0.38 | 0.16 | 5.94 | 1950 | 4 | 0.86 | 0.50 | 4.34 | 0.026 | 0.194 | 3.706 | 0.052 |
| 11 | 0.87 | 0.27 | 0.27 | 5.94 | 1950 | 4 | 0.60 | 0.59 | 4.91 | 0.026 | 0.173 | 4.333 | 0.040 |
| Comparative Example 1 | 0.97 | — | — | — | 2000 | 4 | — | — | 0.84 | — | — | — | — |

TABLE 2

| Examples 1–11 | open porosity % | bulk density g/cm$^3$ | volume resistivity ($\Omega \cdot cm$) || activation energy (eV) | non linear index $\alpha$ | thermal conductivity W/mK | mean grain diameter of columnar aggregates μm | mean grain diameter of AlN μm | crystalline phase (except AlN) |
|---|---|---|---|---|---|---|---|---|---|---|
| | | | 25° C. | 300° C. | | | | | | |
| 1 | 0.01 | 3.26 | 1.1E+12 | 9.9E+08 | 0.40 | 1.75 | 91 | — | 6 | EuAl11O18(EuAl12O19), EuAl2O4 |
| 2 | 0.01 | 3.27 | 1.6E+12 | 1.3E+09 | 0.42 | 1.70 | 106 | — | 5 | EuAl11O18(EuAl12O19), EuAl2O4 |
| 3 | 0.02 | 3.26 | 9.8E+12 | 4.8E+07 | 0.65 | 1.35 | 80 | — | 6 | EuAl11O18(EuAl12O19), Al5O6N |
| 4 | 0.00 | 3.27 | 1.5E+12 | <1E+7 | 0.62* | 1.30 | 74 | — | 7 | EuAl11O18(EuAl12O19), Al5O6N |
| 5 | 0.00 | 3.27 | 7.1E+12 | 1.0E+07 | 0.76 | 1.24 | 81 | — | 6 | EuAl11O18(EuAl12O19), Al5O6N |
| 6 | 0.00 | 3.32 | 4.1E+11 | <1E+7 | 0.66* | 1.38 | 69 | — | 6 | EuAl11O18(EuAl12O19), Al5O6N |
| 7 | 0.01 | 3.28 | 1.2E+12 | 2.2E+09 | 0.35 | 1.10 | 78 | — | 6 | ReAl11O18(ReAl12O19), Al5O6N |
| 8 | 0.01 | 3.28 | 8.2E+12 | 7.3E+07 | 0.66 | 1.05 | 80 | — | 5 | ReAl11O18(ReAl12O19), Al5O6N |
| 9 | 0.01 | 3.30 | 7.9E+10 | 1.0E+08 | 0.39 | 1.39 | 84 | — | 6 | ReAl11O18(ReAl12O19), EuAl2O4, ReAlO3** |
| 10 | 0.01 | 3.31 | 1.3E+12 | 1.7E+08 | 0.51 | 1.04 | 63 | 170 | 8 | ReAl11O18(ReAl12O19), Al5O6N |
| 11 | 0.03 | 3.31 | 4.7E+10 | 5.8E+07 | 0.34 | 1.20 | 59 | 190 | 8 | ReAl11O18(ReAl12O19), Al5O6N |
| Comparative example 1 | 0.04 | 3.26 | 5.2E+09 | <1E+7 | 0.71 | 3.30 | 97 | 8 | 8 | Y4Al2O9 |

*range for measurement 25–200° C,
**Re is Sm or Eu

In Examples 1 and 2, $Eu_2O_3$ alone is added to aluminum nitride. The volume resistivity is reduced to a value of $10^{13}$ Ω·cm or lower and an europium-aluminum composite oxide phase is confirmed, by adding $EU_2O_3$. The activation energy of temperature dependency of volume resistivity was also low.

In Examples 3, 4, 5 and 6, the volume resistivity at room temperature is reduced to a value not higher than $10^{13}$ Ω·cm and the non linear constant "α" is reduced to a value not higher than 1.4, by adding $Al_2O_3$ and reducing the molar ratio $Eu_2O_3/Al_2O_3$.

Also, in Examples 7, 8, 10 and 11, the volume resistivity at room temperature is reduced to a value not higher than $10^{13}$ Ω·cm by reducing the molar ratio $Re_2O_3/Al_2O_3$. The non-linear constant "α" is reduced to a value not higher than 1.3 by increasing the molar ratio $Eu_2O_3/Sm_2O_3$ to 1 or higher.

In Comparative Example 1, $Y_2O_3$ is added as an aid without adding $Eu_2O_3$ and $Sm_2O_3$. The "α" value is proved to be substantially large.

FIG. 1 is a phase diagram of $Eu_2O_3$—$Al_2O_3$ system (Phase Diagrams for Ceramists 1975 Supplement, FIG. 4367). The presence of $EuAl_{11}O_{18}$ phase is confirmed in the phase diagram.

Figure 2:
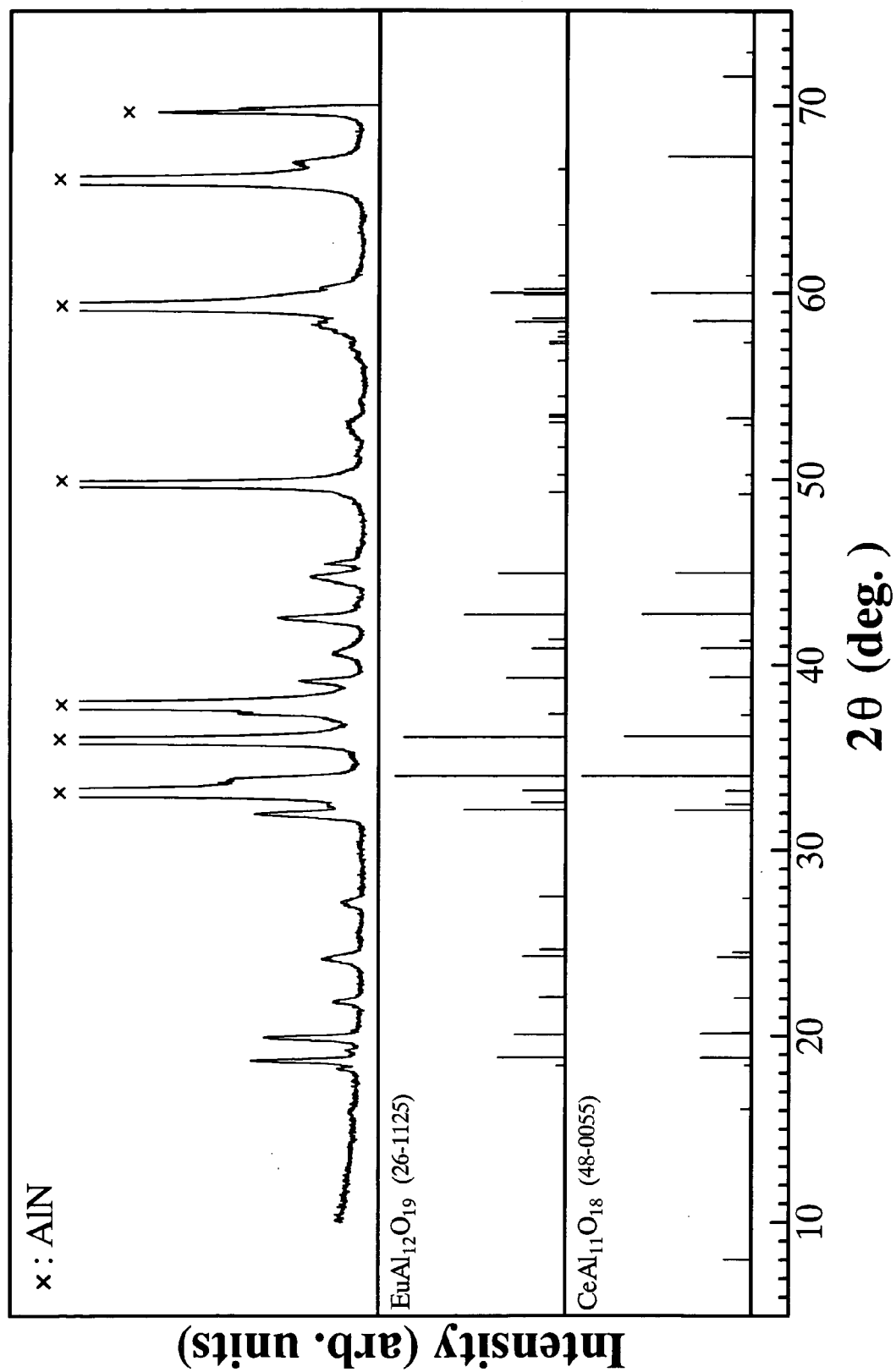
FIG. 2 shows an X-ray diffraction profile of a sample according to Example 6.

FIG. 2 is an X-ray diffraction profile of a sample according to Example 6. An $EUAl_{11}O_{18}$ or $EuAl_{12}O_{19}$ phase and an $Al_5O_6N$ phase are confirmed, other than the AlN phase. Since the JCPDS card of the $EuAl_{11}O_{18}$ phase is not presented, the peak profile of the $CeAl_{11}O_{18}$ phase is shown. Although the positions of peaks of the sample according to Example 6 are substantially identical with those of the card of $EuAl_{12}O_{19}$ phase, a few peaks (for Example near 16°) of the sample are not shown in the card of the $EuAl_{12}O_{19}$ phase. Characteristic diffraction peak tops of an europium-aluminum composite oxide phase are found at an angle of diffraction in a range of 18.5 to 19.0°.

Figure 3:
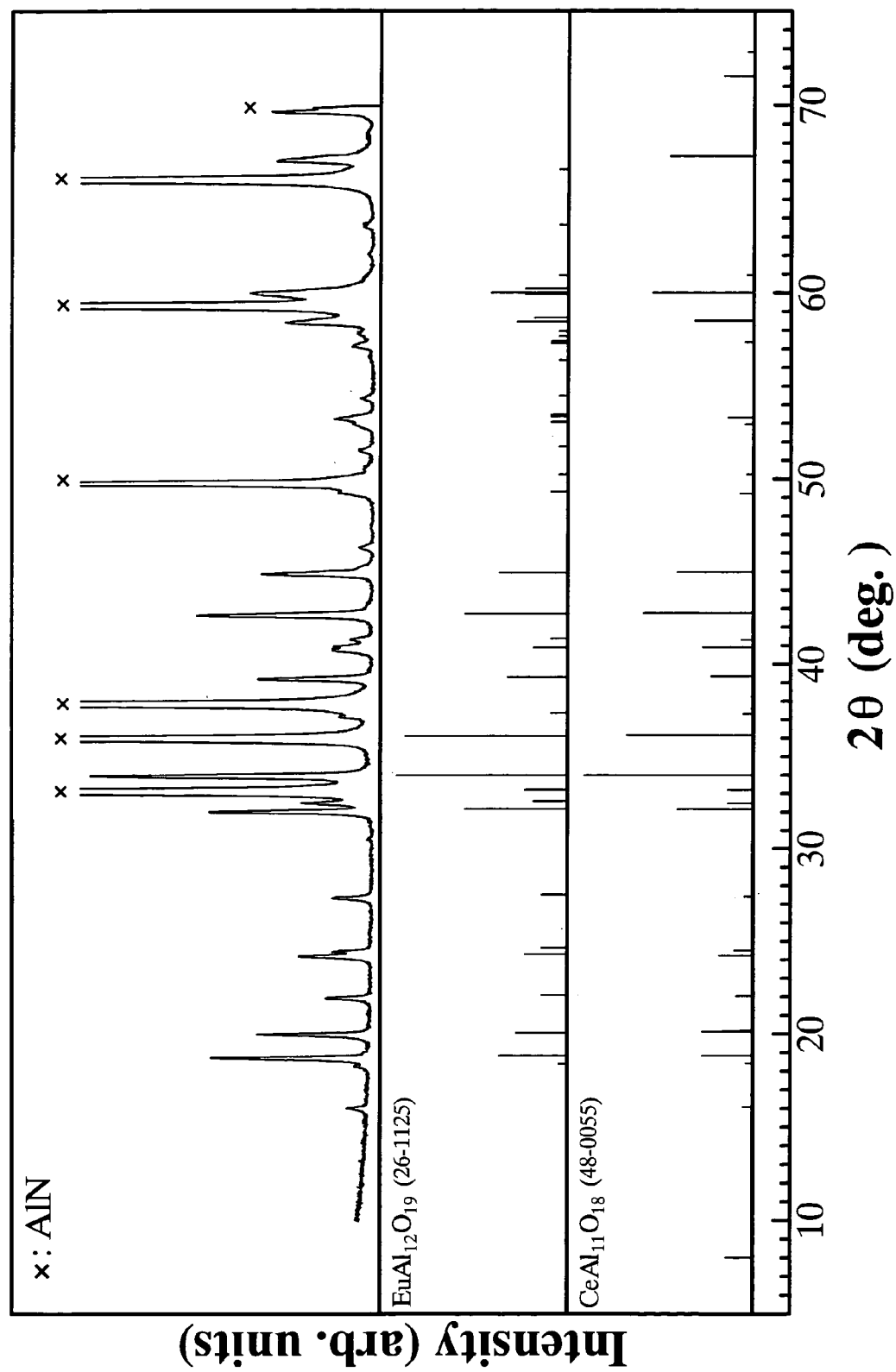
FIG. 3 shows an X-ray diffraction profile of a sample according to Example 11.

FIG. 3 is an X-ray diffraction profile of a sample of Example 11. $EuAl_{11}O_{18}$, $EuAl_{12}O_{19}$ or $SmAl_{11}O_{18}$ phase and $Al_5O_6N$ phase are detected other than AlN phase.

Figure 4:
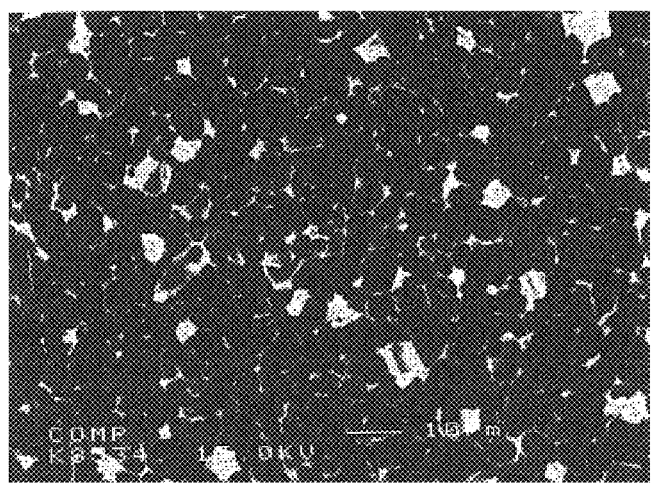
FIG. 4 is a back scattering image taken by a scanning electron microscope of a sample according to Example 6.
Figure 5:
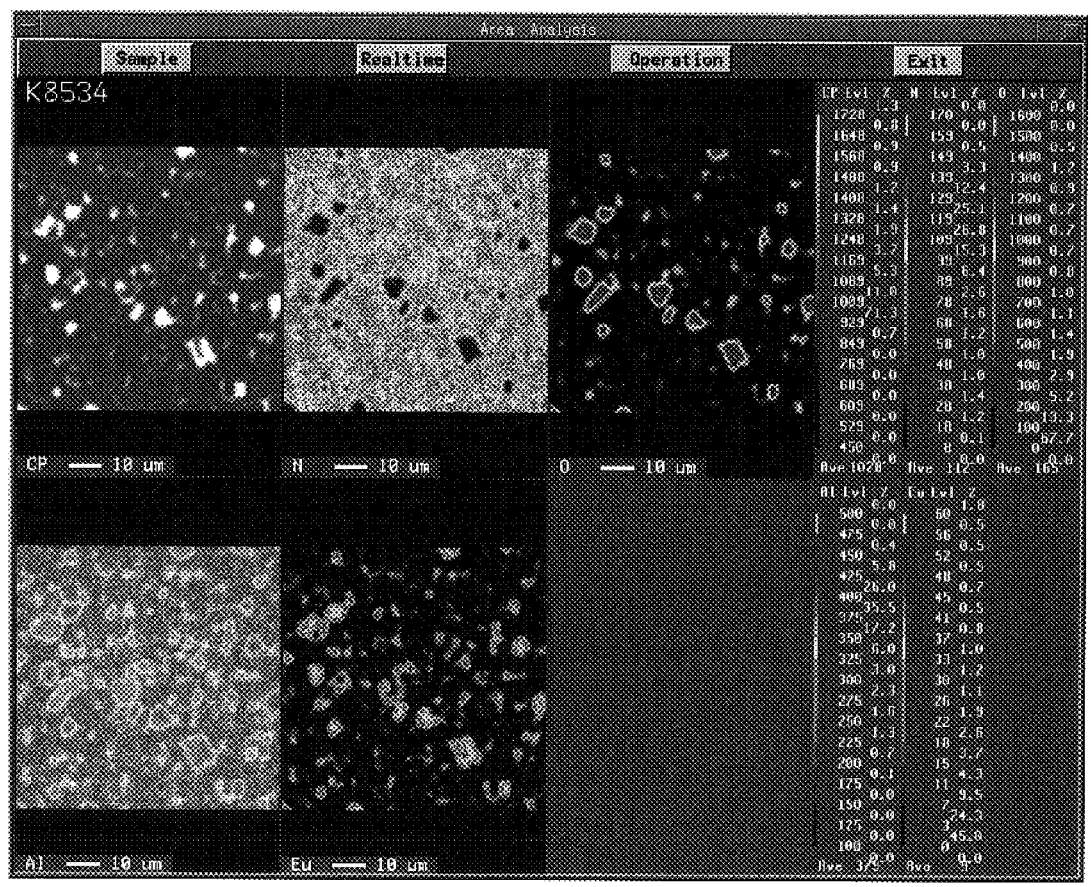
FIG. 5 shows results of analysis of elements by EPMA over the same visual field as FIG. 4.

FIG. 4 shows an backscattering electron image of the sintered body according to Example 6, and FIG. 5 is an image showing distribution of elements in the sintered body taken by EPMA over the same visual field as FIG. 4. The blackish regions correspond with AlN grains and whitish regions correspond with intergranular phase. Elements having large atomic weights present in the whitish regions. As the brightness of the region is higher, a larger amount of elements having larger atomic weights is present in the region. The intergranular regions are interconnected with each other and consist mainly of Eu, O and Al. It is already described that the intergranular phase has a crystalline phase of $EuAl_{11}O_{18}$ or $EuAl_{12}O_{19}$ phase by means of X-ray diffraction analysis.

Figure 6:
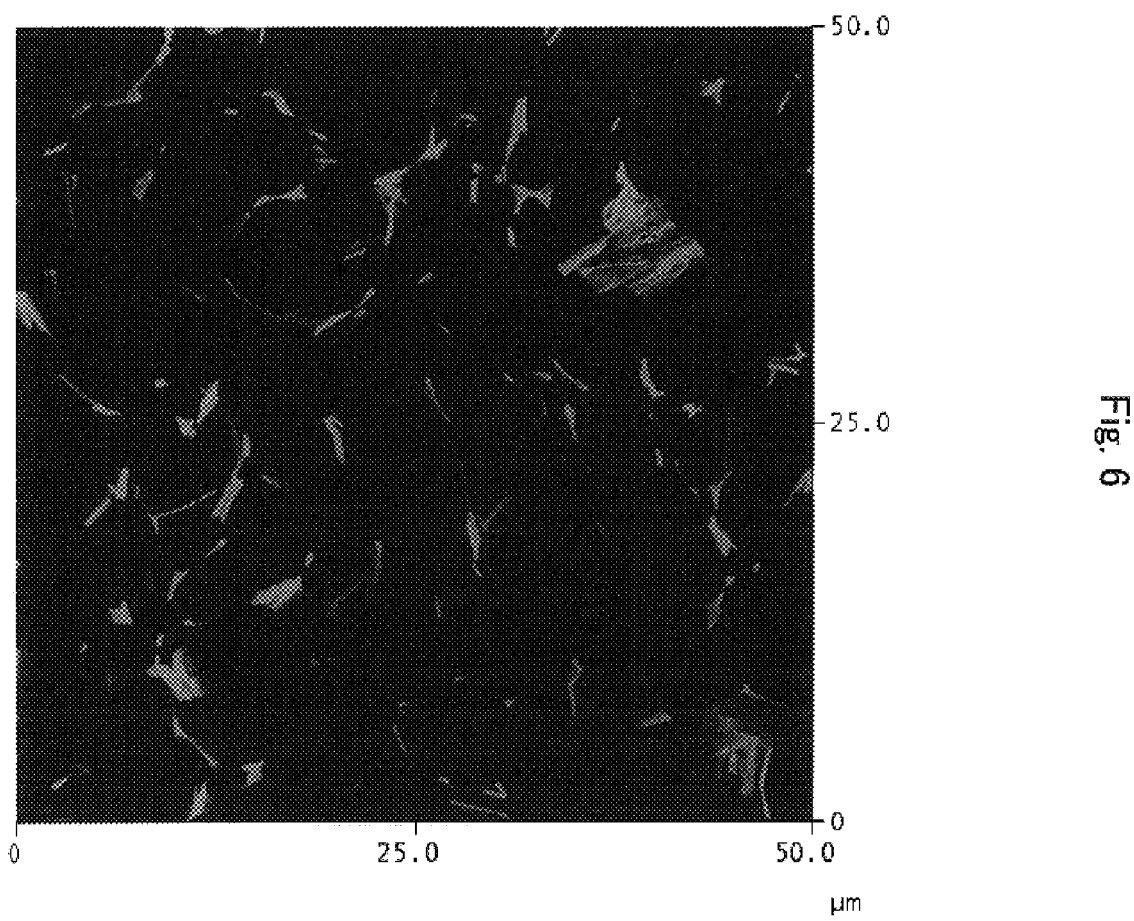
FIG. 6 shows a photograph taken by an atomic force microscope (AFM) showing a current distribution analytic image of a sample according to Example 6.

FIG. 6 is a current distribution analytic images of the sintered body of Example 6 observed using an atomic force microscope (AFM). The test sample had a shape of a plate with dimensions of about 3 mm×5 mm×0.5 mm (thickness). The face of the sample for current distribution analysis was polished. The analysis was carried out using a model "SPM stage D 3100" (probe type "DDESP") supplied by Digital Instruments. The measurement was performed on contact AFM current measurement mode. A direct current (DC) bias was applied on the lower face of the sample and the current distribution on the polished face was measured using the probe. As the image is whitish and brighter, the current value is larger and the conductivity is higher. As can be seen from the image, it is proved that the intergranular phase functions as a conductive phase.

Figure 7:
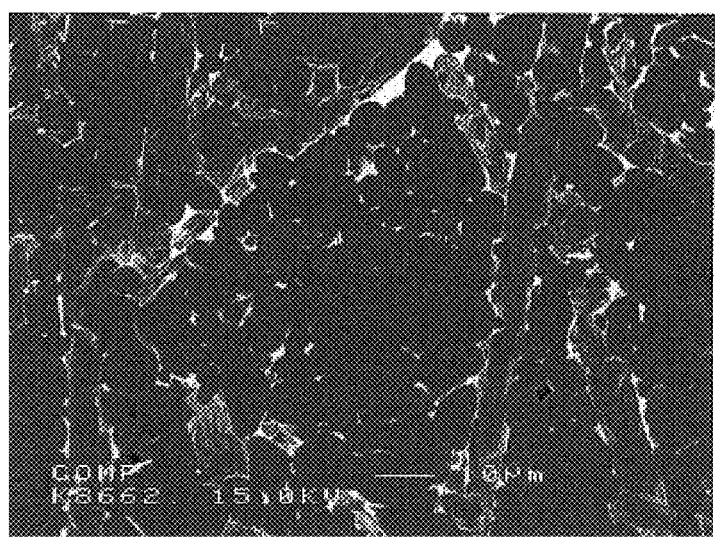
FIG. 7 is a back scattering image taken by a scanning electron microscope of a sample according to Example 11.
Figure 8:
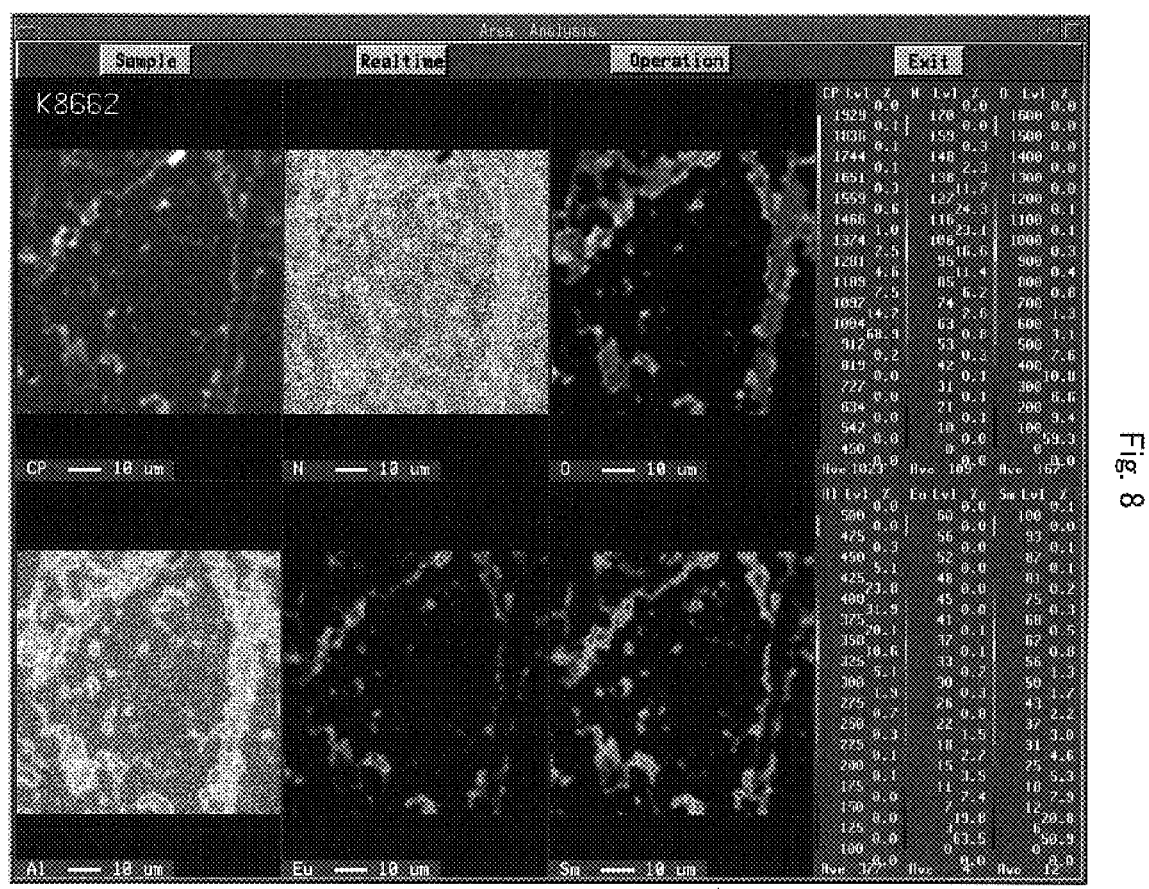
FIG. 8 shows results of analysis of elements by EPMA over the same visual field as FIG. 7.

FIG. 7 is a current distribution analytic image of the sintered body of Example 11, and FIG. 8 is an image showing distribution of elements in the sintered body taken by EPMA over the same visual field as FIG. 7. It is proved that the intergranular regions are interconnected with each other and the distributions of Eu and Sm are identical. The results also correspond with the profile of X-ray diffraction analysis.

Figure 9:
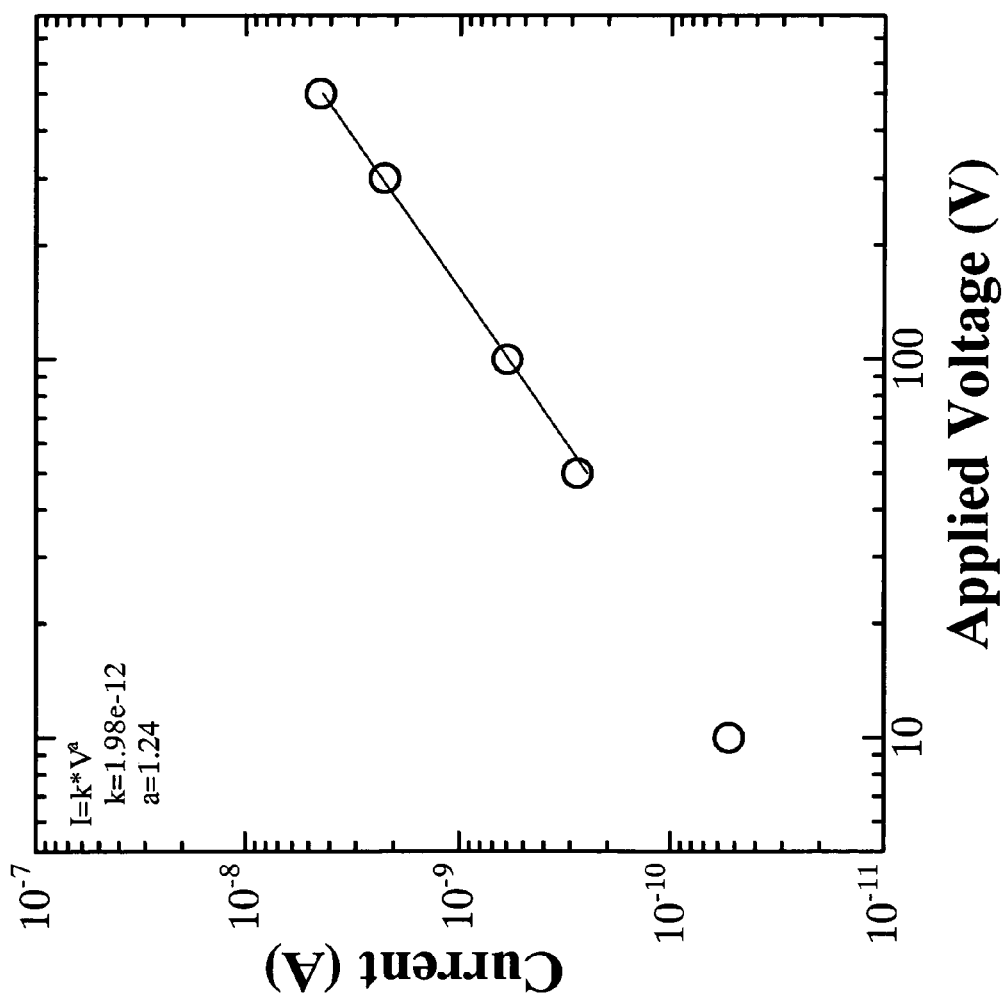
FIG. 9 is a graph showing the dependency of current on applied voltage and results of fitting using method of least squares of Example 5.
Figure 10:
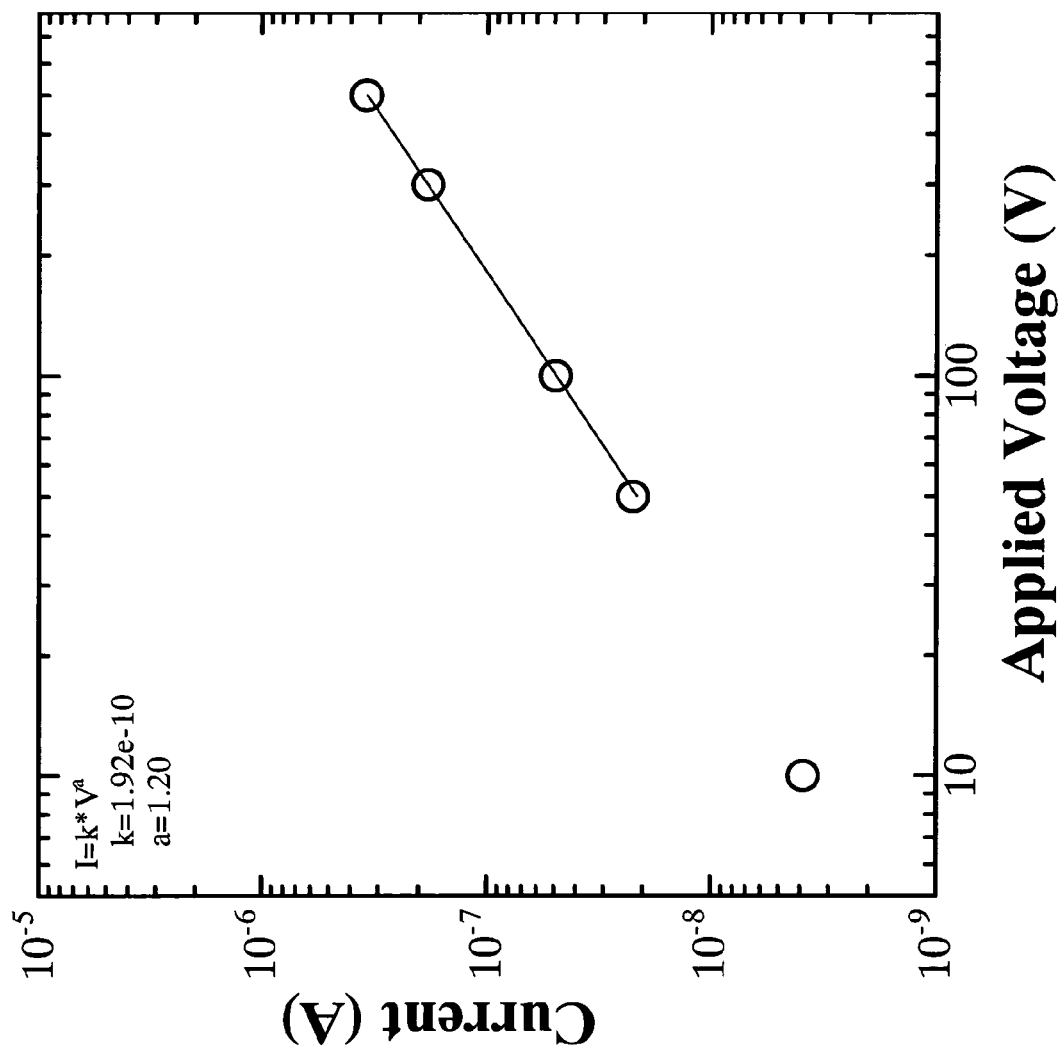
FIG. 10 is a graph showing the dependency of current on applied voltage and results of fitting using method of least squares of Example 11.

FIG. 9 is a graph showing a current value after a voltage of 50 to 500 V/mm is applied on the sample of Example 5 for about 60 seconds. FIG. 10 is a graph showing a current value after a voltage of 50 to 500 V/mm is applied on the sample of Example 11 for about 60 seconds. The linear functions in the figures show the results of method of least squares applying a fitting function of $I=kV^{\alpha}$. The "$\alpha$" value was 1.24 in Example 5 and 1.20 in Example 11, exhibiting nearly ohmic properties. It is thus proved that the inventive material has a small dependency of current value on an applied voltage.

Sintered bodies according to Examples 12 to 15 were produced according to the same procedure as the above examples under the conditions shown in Table 3. In Examples 12 and 13, titanium nitride powder was not added to the raw material, but titanium nitride powder was added to the raw material in Examples 14 and 15. The compositions of Examples 12 and 14 are similar, and the compositions of Examples 13 and 15 are similar. As a result, the resistivity can be slightly reduced by adding titanium nitride. It is thus proved that the volume resistivity can be controlled at a higher precision by adding an element belonging to Group IVA of the Periodic Table such as titanium nitride.

TABLE 3

| | powdery raw material composition | | | | | sintering conditions | | properties of sintered body | | | | | | | |
|---|---|---|---|---|---|---|---|---|---|---|---|---|---|---|---|
| | AlN powder | | | | | maximum | | chemical analysis data | | | | | Re2O3 con- | Al2O3 con- | Re2O3/ |
| Example | oxygen content wt % | Eu2O3 mol % | Sm2O3 mol % | TiN mol % | Al2O3 mol % | temperature °C. | holding time h | Eu content wt % | Sm Content wt % | Ti content wt % | O content wt % | C content wt % | verted content mol % | verted content Mol % | Al2O3 molar ratio |
| 12 | 0.87 | 0.16 | 0.38 | — | 6.0 | 1925 | 4 | 0.51 | 1.17 | — | 5.36 | 0.024 | 0.249 | 4.737 | 0.052 |
| 13 | 0.87 | 0.22 | 0.33 | — | 5.9 | 1925 | 4 | 0.72 | 1.07 | — | 5.22 | 0.024 | 0.264 | 4.586 | 0.058 |
| 14 | 0.87 | 0.16 | 0.38 | 2.4 | 5.8 | 1925 | 4 | 0.51 | 1.22 | 2.78 | 5.57 | 0.078 | 0.260 | 5.008 | 0.052 |
| 15 | 0.87 | 0.22 | 0.33 | 2.4 | 5.8 | 1925 | 4 | 0.89 | 1.35 | 2.96 | 5.94 | 0.081 | 0.340 | 5.338 | 0.064 |

TABLE 4

| | properties of sintered body | | | | | |
|---|---|---|---|---|---|---|
| | open porosity % | bulk density g/cm³ | volume resistivity (Ω·cm) 25° C. | length of columnar aggregates μm | mean grain diameter of AlN μm | crystalline phase (except AlN) |
| example 12 | 0.05 | 3.33 | 9.5E+09 | 210 | 6.7 | EuAl11O18(EuAl12O19), Al5O6N |
| example 13 | 0.02 | 3.33 | 4.5E+10 | 200 | 6.6 | EuAl11O18(EuAl12O19), Al5O6N |
| example 14 | 0.00 | 3.39 | 3.2E+09 | 190 | 6.3 | EuAl11O18(EuAl12O19), Al5O6N |
| example 15 | 0.02 | 3.37 | 2.9E+09 | 180 | 6.0 | EuAl11O18(EuAl12O19), Al5O6N |

Sintered bodies of Examples 16 to 18 were produced according to the same procedure as the above example under the conditions shown in Table 5. Titanium nitride and magnesium oxide were added to the raw material. The sintered bodies of Examples 16 to 18 had columnar aggregates formed therein, and the intergranular phase forms network like structure in the aggregates. The polished surface of each sintered body was observed as a back scattering image in a magnitude of 200 to measure the lengths of the columnar aggregates. It was proved that the length of the columnar aggregates and mean grain diameter of AlN grains were smaller as the content of MgO is higher. The aspect ratio of the columnar aggregates was proved to be 10 to 17 in Examples 16 to 18.

under the conditions shown in Table 7. Titanium nitride and magnesium oxide or calcium oxide were, however, added to the raw material. It was thus proved that the volume resistivity was lowered as the columnar aggregates are made longer in Examples 19 to 23, especially as shown in Table 8. Further, the same tendency was observed in Examples 26

TABLE 5

| | powdery raw material compositions | | | | | | sintering conditions | |
|---|---|---|---|---|---|---|---|---|
| | AlN powder | | | | | | | |
| example | oxygen content wt % | Eu2O3 mol % | Sm2O3 mol % | TiN mol % | MgO mol % | Al2O3 mol % | maximum temperature ° C. | holding time h |
| 16 | 0.87 | 0.17 | 0.17 | 1.5 | 0.029 | 3.5 | 1925 | 2 |
| 17 | 0.87 | 0.17 | 0.17 | 1.5 | 0.12 | 3.5 | 1925 | 2 |
| 18 | 0.87 | 0.17 | 0.17 | 1.5 | 0.23 | 3.3 | 1925 | 2 |

| | properties of sintered body | | | | | | | | |
|---|---|---|---|---|---|---|---|---|---|
| | chemical analysis data | | | | | | Re2O3 | Al2O3 | Re2O3/ |
| example | Eu content wt % | Sm content wt % | Ti content wt % | Mg content wt % | O content wt % | C content wt % | converted content mol % | converted content mol % | Al2O3 molar ratio |
| 16 | 0.91 | 0.91 | 1.96 | 0.015 | 4.27 | 0.062 | 0.268 | 3.676 | 0.073 |
| 17 | 0.86 | 0.87 | 1.99 | 0.06 | 4.54 | 0.071 | 0.255 | 3.923 | 0.065 |
| 18 | 0.86 | 0.86 | 2.00 | 0.12 | 3.91 | 0.067 | 0.251 | 3.272 | 0.077 |

TABLE 6

| | properties of sintered body | | | | |
|---|---|---|---|---|---|
| | open porosity % | bulk density g/cm³ | volume resistivity (Ω·cm) 25° C. | length of columnar aggregates mm | mean grain diameter of AlN μm | crystalline phase (except AlN) |
| example 16 | 0.09 | 3.34 | 2.3E+10 | 140 | 6.3 | EuAl11O18(EuAl12O19), Al5O6N, EuAl2O4, ReAlO3 |
| example 17 | 0.09 | 3.34 | 1.7E+10 | 130 | 5.5 | EuAl11O18(EuAl12O19), Al5O6N |
| example 18 | 0.01 | 3.35 | 4.6E+10 | 100 | 4.3 | EuAl11O18(EuAl12O19) |

Sintered bodies of Examples 19 to 34 were produced according to the same procedure as the above examples to 29. The aspect ratio of the columnar aggregates was proved to be 10 to 30 in Examples 19 to 34.

TABLE 7

| | powdery raw material compositions | | | | | | | sintering conditions | |
|---|---|---|---|---|---|---|---|---|---|
| | AlN powder | | | | | | | | |
| Ex | oxygen content Wt % | Eu2O3 mol % | Sm2O3 mol % | TiN mol % | MgO Mol % | CaO mol % | Al2O3 mol % | maximum temperature ° C. | holding time h |
| 19 | 0.87 | 0.085 | 0.086 | 0.77 | 0.12 | — | 1.5 | 1925 | 2 |
| 20 | 0.87 | 0.10 | 0.10 | 0.92 | 0.12 | — | 1.9 | 1925 | 2 |
| 21 | 0.87 | 0.12 | 0.12 | 1.1 | 0.12 | — | 2.4 | 1925 | 2 |
| 22 | 0.87 | 0.17 | 0.17 | 1.5 | — | — | 3.3 | 1925 | 2 |
| 23 | 0.87 | 0.19 | 0.19 | 1.7 | — | — | 3.9 | 1925 | 2 |
| 24 | 0.87 | 0.27 | 0.27 | 2.4 | — | — | 5.6 | 1925 | 2 |
| 25 | 0.87 | 0.17 | 0.17 | 1.5 | 0.12 | — | 2.9 | 1925 | 4 |
| 26 | 0.87 | 0.17 | 0.17 | 1.5 | — | 0.15 | 3.6 | 1925 | 2 |
| 27 | 0.87 | 0.17 | 0.17 | 1.5 | 0.12 | — | 3.6 | 1910 | 4 |
| 28 | 0.87 | 0.17 | 0.17 | 1.5 | 0.2 | — | 3.8 | 1900 | 4 |
| 29 | 0.87 | 0.22 | 0.22 | 2.5 | 0.15 | — | 4.7 | 1900 | 4 |
| 30 | 0.87 | 0.37 | 0.16 | 2.4 | — | — | 5.8 | 1950 | 4 |
| 31 | 0.87 | 0.37 | 0.16 | 2.4 | 0.19 | — | 5.8 | 1950 | 4 |
| 32 | 0.87 | 0.13 | 0.20 | 1.5 | 0.35 | — | 3.6 | 1925 | 2 |

TABLE 7-continued

| | | | | | | | | | |
|---|---|---|---|---|---|---|---|---|---|
| 33 | 0.87 | 0.13 | 0.20 | 1.5 | 0.67 | — | 5.1 | 1900 | 2 |
| 34 | 0.87 | 0.13 | 0.20 | 1.5 | 0.48 | — | 4.9 | 1900 | 2 |

| | properties of sintered body | | | | | | | | |
|---|---|---|---|---|---|---|---|---|---|
| Ex | Eu content wt % | Sm content wt % | Ti content wt % | Mg content wt % | Ca content wt % | O content wt % | C content wt % | Re2O3 converted content mol % | Al2O3 converted content mol % | Re2O3/Al2O3 Molar ratio |
| 19 | 0.55 | 0.61 | 1.17 | 0.064 | — | 2.18 | 0.43 | 0.164 | 1.741 | 0.094 |
| 20 | 0.56 | 0.56 | 1.37 | 0.059 | — | 2.57 | 0.051 | 0.159 | 2.109 | 0.076 |
| 21 | 0.60 | 0.60 | 1.57 | 0.060 | — | 3.23 | 0.057 | 0.173 | 2.717 | 0.064 |
| 22 | 0.84 | 0.83 | 1.75 | — | — | 4.10 | 0.067 | 0.244 | 3.534 | 0.069 |
| 23 | 0.90 | 0.87 | 2.11 | — | — | 4.75 | 0.038 | 0.262 | 4.167 | 0.063 |
| 24 | 1.01 | 1.04 | 2.83 | — | — | 5.63 | 0.097 | 0.309 | 5.037 | 0.061 |
| 25 | 0.87 | 0.81 | 2.39 | 0.060 | — | 3.73 | 0.063 | 0.245 | 3.148 | 0.078 |
| 26 | 0.75 | 0.75 | 1.90 | — | 0.060 | 4.76 | 0.062 | 0.221 | 4.179 | 0.053 |
| 27 | 0.85 | 0.86 | 1.97 | 0.060 | — | 4.80 | 0.056 | 0.253 | 4.181 | 0.060 |
| 28 | 0.77 | 0.78 | 2.02 | 0.11 | — | 5.92 | 0.055 | 0.232 | 5.290 | 0.044 |
| 29 | 1.22 | 1.20 | 3.19 | 0.077 | — | 5.72 | 0.079 | 0.367 | 5.047 | 0.077 |
| 30 | 0.70 | 0.31 | 2.92 | — | — | 4.83 | 0.079 | 0.149 | 4.346 | 0.034 |
| 31 | 1.67 | 0.76 | 3.17 | 0.085 | — | 6.18 | 0.086 | 0.370 | 5.516 | 0.067 |
| 32 | 0.64 | 0.99 | 1.87 | 0.177 | — | 4.29 | 0.071 | 0.237 | 3.612 | 0.065 |
| 33 | 0.71 | 1.06 | 1.93 | 0.344 | — | 4.97 | 0.065 | 0.260 | 4.156 | 0.063 |
| 34 | 0.69 | 1.05 | 1.90 | 0.442 | — | 4.84 | 0.063 | 0.255 | 3.967 | 0.064 |

TABLE 8 properties of sintered body

| Example | open porosity % | bulk density g/cm³ | volume resistivity (Ω·cm) 25° C. | length of columnar aggregates μm | mean grain diameter of AlN μm | crystalline phase (except AlN) |
|---|---|---|---|---|---|---|
| 19 | 0.03 | 3.31 | 3.7E+11 | 60 | 3.9 | EuAl11O18(EuAl12O19), EuAl2O4, ReAlO3, MgAl2O3 |
| 20 | 0.01 | 3.31 | 1.3E+11 | 70 | 4.0 | EuAl11O18(EuAl12O19), ReAlO3 |
| 21 | 0.11 | 3.31 | 3.0E+10 | 80 | 4.7 | EuAl11O18(EuAl12O19) |
| 22 | 0.07 | 3.33 | 1.2E+10 | 210 | 4.9 | EuAl11O18(EuAl12O19), EuAl2O4, ReAlO3 |
| 23 | 0.08 | 3.34 | 1.0E+10 | 210 | 4.9 | EuAl11O18(EuAl12O19), Al5O6N, EuAl2O4, ReAlO3 |
| 24 | 0.10 | 3.37 | 1.2E+10 | 160 | 5.8 | EuAl11O18(EuAl12O19), Al5O6N |
| 25 | 0.04 | 3.33 | 5.5E+10 | 40 | 5.8 | ReAl11O18(ReAl12O19), EuAl2O4, ReAlO3 |
| 26 | 0.07 | 3.37 | 7.4E+10 | 270 | 4.9 | ReAl11O18(ReAl12O19), Al5O6N |
| 27 | 0.03 | 3.34 | 2.5E+10 | 290 | 4.6 | ReAl11O18(ReAl12O19), Al5O6N |
| 28 | 0.02 | 3.36 | 3.9E+10 | 120 | 4.9 | ReAl11O18(ReAl12O19), Al5O6N |
| 29 | 0.00 | 3.41 | 1.7E+11 | 160 | 5.0 | ReAl11O18(ReAl12O19), Al5O6N |
| 30 | 0.02 | 3.37 | 6.9E+12 | 210 | 6.5 | ReAl11O18(ReAl12O19), ReAlO3 |
| 31 | 0.04 | 3.37 | 2.6E+12 | 190 | 6.3 | ReAl11O18(ReAl12O19), Al5O6N |
| 32 | 0.01 | 3.37 | 1.2E+10 | 110 | 4.7 | ReAl11O18(ReAl12O19), ReAlO3, MgAl2O3 |
| 33 | 0.00 | 3.35 | 2.8E+10 | 100 | 4.1 | ReAl11O18(ReAl12O19), ReAlO3, MgAl2O3 |
| 34 | 0.01 | 3.35 | 1.2E+11 | 120 | 4.2 | ReAl11O18(ReAl12O19), ReAlO3, MgAl2O3 |

As described above, the present invention provides a novel aluminum nitride material of aluminum nitride base and having a low volume resistivity at room temperature.

The present invention has been explained referring to the preferred embodiments, however, the present invention is not limited to the illustrated embodiments which are given by way of examples only, and may be carried out in various modes without departing from the scope of the invention.

The invention claimed is:

1. An aluminum nitride material comprising aluminum nitride as a main component and europium and samarium in a total content of at least 0.09 mol % calculated as the oxides, said aluminum nitride material comprising an aluminum nitride phase and a composite oxide phase containing at least europium and aluminum.

2. The aluminum nitride material of claim 1 having a room temperature volume resistivity of $10^{13}$ Ω·cm or lower at an applied voltage of 500 V/mm.

3. The aluminum nitride material of claim 2, wherein a molar ratio of the total content of europium and samarium calculated as the oxides to that of alumina is [(Eu$_2$O$_3$+ Sm$_2$O)/Al$_2$O$_3$] is 0.4 or lower.

4. The aluminum nitride material of claim 2, wherein said composite oxide phase comprises at least one of an europium-aluminum composite oxide phase and an europium-samarium-aluminum composite oxide phase.

5. The aluminum nitride material of claim 3, wherein said composite oxide phase comprises at least one of an europium-aluminum composite oxide phase and an europium-samarium-aluminum composite oxide phase.

6. The aluminum nitride material of claim 1, wherein said composite oxide phase has a peak top in a range of 18.5 to 19.0° in an X-ray diffraction chart.

7. The aluminum nitride material of claim 5, wherein said composite oxide phase has a peak top in a range of 18.5 to 19.0° in an X-ray diffraction chart.

8. The aluminum nitride material of claim 1, wherein a non-linear index "α" is 1.6 or lower for "V" values in a range of 50 V/mm to 500 V/mm when I=kV$^α$, wherein "V" represents a voltage applied on said aluminum nitride material, "I" represents a leakage current at a voltage of "V" and "k" represents a constant.

9. The aluminum nitride material of claim 7, wherein having a non-linear index "α" is 1.6 or lower for "V" values in a range of 50 V/mm to 500 V/mm when I=kV$^α$, wherein "V" represents a voltage applied on said aluminum nitride material, "I" represents a leakage current at a voltage of "V" and "k" represents a constant.

10. The aluminum nitride material of claim 1, wherein an activation energy of temperature dependency of volume resistivity from room temperature to 300° C. is 0.4 eV or lower.

11. The aluminum nitride material of claim 9, wherein an activation energy of temperature dependency of volume resistivity from room temperature to 300° C. is 0.4 eV or lower.

12. The aluminum nitride material of claim 1, comprising aggregates having at least one crystalline phase selected from the group consisting of aluminum nitride, aluminum oxide, aluminum oxynitride and an aluminum-magnesium composite oxide and an intergranular phase including at least one phase selected from the group consisting of (Re)Al$_{11}$O$_{18}$, (Re)Al$_{11}$O$_{19}$, and Mg(Re)Al$_{12}$O$_{19}$ phases (Re represents Eu and/or Sm), wherein said intergranular phase forms a network microstructure in said aggregate, and wherein said aggregate has a column shape having an aspect ratio of at least 2 and a length in a range of 10 to 1000 μm when a polished surface of said aluminum nitride material is observed as a backscattering electron image.

13. The aluminum nitride material of claim 11, comprising aggregates having at least one crystalline phase selected from the group consisting of aluminum nitride, aluminum oxide, aluminum oxynitride and an aluminum-magnesium composite oxide and an intergranular phase including at least one phase selected from the group consisting of (Re)Al$_{11}$O$_{18}$, (Re)Al$_{12}$O$_{19}$, and Mg(Re)Al$_{12}$O$_{19}$ phases (Re represents Eu and/or Sm), and wherein said intergranular phase forms a network microstructure in said aggregate, and wherein said aggregate has a column shape having an aspect ratio of at least 2 and a length in a range of 10 to 1000 μm when a polished surface of said aluminum nitride material is observed as a backscattering electron image.

14. The aluminum nitride material of claim 1, wherein said aluminum nitride phase comprises grains having a mean grain diameter of 3 μm or more.

15. The aluminum nitride material of claim 13, wherein said aluminum nitride phase comprises grains having a mean grain diameter of 3 μm or more.

16. The material of claim 1 comprising 0.01 to 2 mol % of an element belonging to Group IIA of the Periodic Table calculated as the oxide.

17. The material of claim 15 comprising 0.01 to 2 mol % of an element belonging to Group IIA of the Periodic Table calculated as the oxide.

18. The material of claim 16, wherein said Group IIA element is one of Mg and Ca.

19. The material of claim 17, wherein said Group IIA element is one of Mg and Ca.

20. An aluminum nitride material comprising aluminum nitride as a main component, at least 0.03 mol % of europium calculated as the oxide (Eu$_2$O$_3$), 0.01 to 2 mol % of one of magnesium oxide and calcium oxide, and 0.01 to 10 mol % of an element belonging to Group IVA of the Periodic Table calculated as the nitride;
wherein said aluminum nitride material comprises aluminum nitride and europium-aluminum composite oxide phases; and
wherein said aluminum nitride material has a room temperature volume resistivity of 10$^{13}$ Ω·cm or lower at an applied voltage of 500 V/mm.

21. An aluminum nitride material comprising aluminum nitride as a main component and at least 0.03 mol % of europium calculated as the oxide (Eu$_2$O$_3$), 0.01 to 2 mol % of one of magnesium oxide and calcium oxide, and 0.01 to 10 mol % of an element belonging to Group IVA of the Periodic Table calculated as the nitride, wherein a molar ratio of europium calculated as the oxide to that of alumina (Eu$_2$O$_3$/Al$_2$O$_3$) is in a range of 0.03 to 0.2;
wherein said aluminum nitride material comprises an aluminum nitride phase including grains having a mean grain diameter of at least 4 μm and an europium-aluminum composite oxide phase, said europium-aluminum composite oxide phase comprising a network microstructure and including at least one of an EuAl$_{11}$O$_{18}$ phase and an EuAl$_{12}$O$_{19}$ phase;
wherein said aluminum nitride material has a room temperature volume resistivity of 10$^{13}$ Ω·cm or lower at an applied voltage of 500 V/mm;
wherein a non-linear index "α" is 1.6 or lower for "V" values in a range of 50 V/mm to 500 V/mm when I=kV$^α$, wherein "V" represents a voltage applied on said aluminum nitride material, "I" represents a leakage current at voltage "V" and "k" represents a constant; and
wherein an activation energy of temperature dependency of volume resistivity of said aluminum nitride material from room temperature to 300° C. is 0.4 eV or lower.

22. The material of claim 18, comprising 0.01 to 10 mol % of an element belonging to Group IVA of the Periodic Table calculated as the nitride.

23. The material of claim 19, comprising 0.01 to 10 mol % of an element belonging to Group IVA of the Periodic Table calculated as the nitride.

24. The material of claim 20, wherein said Group IVA element is Ti.

25. The material of claim 21, wherein said Group IVA element is Ti.

26. The material of claim 22, wherein said Group IVA element is Ti.

27. The material of claim 23, wherein said Group IVA element is Ti.

28. A sintered body comprising the aluminum nitride material of claim 24, obtained by sintering the aluminum nitride material at a temperature in a range of 1800 to 2200° C.

29. A sintered body comprising the aluminum nitride material of claim 25, obtained by sintering the aluminum nitride material at a temperature in a range of 1800 to 2200° C.

30. A sintered body comprising the aluminum nitride material of claim 26, obtained by sintering the aluminum nitride material at a temperature in a range of 1800 to 2200° C.

31. A sintered body comprising the aluminum nitride material of claim 27, obtained by sintering the aluminum nitride material at a temperature in a range of 1800 to 2200° C.

32. A member for a semiconductor producing system, said member comprising the material of claim 28.

33. A member for a semiconductor producing system, said member comprising the material of claim 29.

34. A member for a semiconductor producing system, said member comprising the material of claim 30.

35. A member for a semiconductor producing system, said member comprising the material of claim 31.

* * * * *

UNITED STATES PATENT AND TRADEMARK OFFICE
CERTIFICATE OF CORRECTION

PATENT NO.       : 7,122,490 B2                                             Page 1 of 1
APPLICATION NO.  : 10/785774
DATED            : October 17, 2006
INVENTOR(S)      : Yoshimasa Kobayashi et al.

It is certified that error appears in the above-identified patent and that said Letters Patent is hereby corrected as shown below:

Abstract

*Line 7*: please change "also" to --is--

Column 16

*Line 51*: please delete "is"
    *Line 52*: please change "$Sm_2O)/Al_2O_3$]" to --$Sm_2O_3)/Al_2O_3$ ]--

Column 17

*Line 27*: please change "$(Re)Al_{11}O_{19}$" to --$(Re)Al_{12}O_{19}$--

Column 18

*Line 7*: please change "$10_{13}$" to --$10^{13}$--

Signed and Sealed this

Ninth Day of January, 2007

JON W. DUDAS
*Director of the United States Patent and Trademark Office*